(12) United States Patent
Qiu et al.

(10) Patent No.: US 12,073,430 B2
(45) Date of Patent: Aug. 27, 2024

(54) METHOD AND SYSTEM FOR DETECTING FRAUDULENT ADVERTISEMENT ACTIVITY

(71) Applicant: YAHOO AD TECH LLC, Dulles, VA (US)

(72) Inventors: Angus Xianen Qiu, Sunnyvale, CA (US); Liang Wang, San Jose, CA (US); Chun Han, Fremont, CA (US); Jaime Morales, Urbana, IL (US)

(73) Assignee: YAHOO AD TECH LLC, Dulles, VA (US)

( * ) Notice: Subject to any disclaimer, the term of this patent is extended or adjusted under 35 U.S.C. 154(b) by 760 days.

(21) Appl. No.: 15/794,991

(22) Filed: Oct. 26, 2017

(65) Prior Publication Data

US 2019/0130440 A1 May 2, 2019

(51) Int. Cl.
*G06Q 20/00* (2012.01)
*G06Q 30/0241* (2023.01)
*H04L 9/40* (2022.01)
*G06Q 10/067* (2023.01)

(52) U.S. Cl.
CPC ..... *G06Q 30/0248* (2013.01); *G06Q 30/0277* (2013.01); *H04L 63/101* (2013.01); *H04L 63/1425* (2013.01); *G06Q 10/067* (2013.01); *H04L 2463/144* (2013.01)

(58) Field of Classification Search
CPC ........... G06Q 30/0248; G06Q 30/0277; G06Q 10/067; H04L 63/101; H04L 63/1425; H04L 2463/144
See application file for complete search history.

(56) References Cited

U.S. PATENT DOCUMENTS

| 8,356,247 B2 * | 1/2013 | Krassner | G06F 16/9577 |
| | | | 715/234 |
| 9,954,881 B1 * | 4/2018 | Lin | H04L 67/535 |
| 10,148,683 B1 * | 12/2018 | Lin | H04W 12/06 |
| 10,652,270 B1 * | 5/2020 | Hu | H04L 63/1441 |

(Continued)

OTHER PUBLICATIONS

Jakobsson; How Criminals Profit; "The Death of the Internet" Chapter 3; pp. 19-55; 2012.*

(Continued)

*Primary Examiner* — Radu Andrei
(74) *Attorney, Agent, or Firm* — Venable LLP

(57) ABSTRACT

The present teaching relates to a fraud detecting system and method for providing protection against fraudulent advertisement requests. Upon receiving a request for an advertisement, the system extracts an identifier, associated with a source from which the request originates, included in the request. The system determines whether the extracted identifier is included in a list of designated identifiers, and when the identifier is included in the list, the system denies the request for the advertisement. When the identifier is not included in the list of designated identifiers, the system provides the advertisement in response to the request, and extracts a set of features from the request and other requests that originate from the source to determine whether the identifier associated with the source is to be included in the list of designated identifiers based on the set of features in accordance with one or more models.

17 Claims, 13 Drawing Sheets

(56) References Cited

U.S. PATENT DOCUMENTS

| | | | | |
|---|---|---|---|---|
| 2008/0288405 A1* | 11/2008 | John | | G06Q 20/40 |
| | | | | 705/44 |
| 2009/0012905 A1* | 1/2009 | Mawani | | G06Q 50/188 |
| | | | | 705/1.1 |
| 2010/0145762 A1* | 6/2010 | Coladonato | | G06Q 30/02 |
| | | | | 705/14.4 |
| 2011/0167474 A1* | 7/2011 | Sinha | | G06F 21/51 |
| | | | | 726/1 |
| 2011/0296009 A1* | 12/2011 | Baranov | | G06Q 30/02 |
| | | | | 709/224 |
| 2012/0272331 A1* | 10/2012 | Lemaster | | H04L 63/1441 |
| | | | | 726/27 |
| 2013/0066707 A1* | 3/2013 | Umeda | | G06Q 30/0272 |
| | | | | 705/14.42 |
| 2013/0247192 A1* | 9/2013 | Krasser | | H04L 63/1425 |
| | | | | 726/23 |
| 2014/0156390 A1* | 6/2014 | Aaron | | G06Q 30/0272 |
| | | | | 705/14.47 |
| 2015/0220619 A1* | 8/2015 | Gray | | G06F 16/2246 |
| | | | | 707/738 |
| 2015/0348498 A1* | 12/2015 | Anderson | | G06F 3/147 |
| | | | | 345/520 |
| 2018/0035174 A1* | 2/2018 | Littlejohn | | H04N 21/8358 |
| 2018/0097828 A1* | 4/2018 | Coskun | | H04W 12/08 |
| 2018/0351977 A1* | 12/2018 | Carothers | | G06F 21/552 |
| 2020/0067861 A1* | 2/2020 | Leddy | | G06F 21/6245 |

OTHER PUBLICATIONS

Kantardzic; Improving Click Fraud Detection; IEEE; pp. 69-74; 2008.*

Nandhini; An assessment and methodology for fraud detection; ICONSTEM; pp. 104-108; 2016.*

* cited by examiner

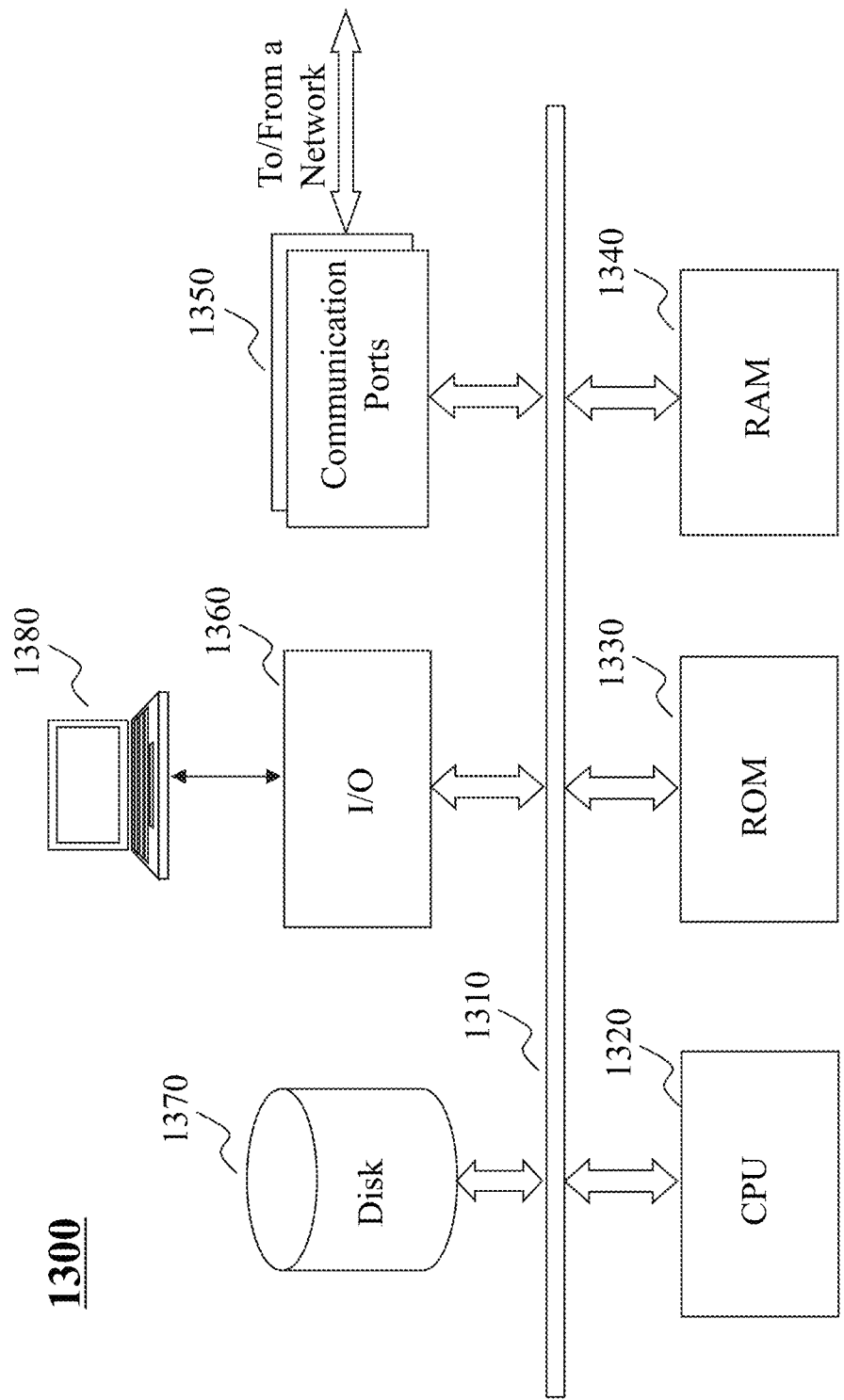

METHOD AND SYSTEM FOR DETECTING FRAUDULENT ADVERTISEMENT ACTIVITY

BACKGROUND

1. Technical Field

The present teaching generally relates to the field of advertising. More specifically, the present teaching relates to a framework that detects fraudulent activities in an online advertisement exchange.

2. Technical Background

Online advertisements (ads) provide a powerful mechanism for advertisers to effectively target Web users. Ads can be customized based on a user's browsing behavior, geographic location, and personal interests. Online advertising serves as a primary source of revenue for some of the most popular websites on the Internet. In order to meet the immense market demand, and to manage the complex relationships between advertisers and publishers (i.e., the websites hosting the ads), marketplaces known as "ad-exchanges" are employed. These exchanges allow publishers (i.e., sellers of ad space) and advertisers (i.e., buyers of this ad space) to dynamically broker traffic through ad networks to efficiently maximize profits for all parties.

In its simplest form, online advertising is a buyer/seller relationship between those who want to show ads (advertisers, who buy space on Web pages) and those who get paid to display ads for others for a fee (publishers, or sellers, who own the Web pages). The process becomes more complicated as more advertisers and publishers are added to the system. To facilitate such endeavors, an intermediary entity referred to as an ad-network can be employed that keeps track of publishers and advertisers within its domain.

Ad-exchanges operate in a manner similar to an ad-network, where the entities that buy or sell ads are ad-networks. This allows one ad network to sell its publishers' ad space to another network, or buy ad space for its advertisers, so that advertisers are able to reach a much larger audience than they could if they were part of a single ad-network.

Unfortunately, the complexities of these systems invite a considerable amount of abuse from cybercriminals, who profit at the expense of the advertisers. While ad-exchanges provide a powerful mechanism for advertisers, ad-networks, and publishers to efficiently manage their ad traffic, they have also become a lucrative target for cybercriminals. In particular, miscreants have developed malware that is used to remotely control compromised computers, known as bots, and network them into a single botnet. A botnet can be instructed to view and click ads, simulating user traffic. As a result, botnet operators can generate revenue simply by creating a website, signing up as a publisher, and directing their bots to view and click on the advertisements contained on their own website. Accordingly, there is a requirement to develop a framework that detects such fraudulent activities.

SUMMARY

The teachings disclosed herein relate to methods, systems, and programming for advertising. More particularly, the present teaching relates to methods, systems, and programming related to detecting fraudulent sources of advertisements.

An aspect of the present disclosure provides for a method, implemented on a machine having at least one processor, storage, and a communication platform capable of connecting to a network for providing protection against fraudulent advertisement requests. The method can be implemented by a fraud detecting system and includes the following steps: receiving a request for an advertisement, and extracting, by a request handling unit included in the fraud detection system, an identifier included in the request. The identifier is associated with a source from which the request originates. The fraud detection system is further configured to determine whether the extracted identifier is included in a list of designated identifiers. Further, when the identifier is included in the list of designated identifiers, the fraud detection system denies the request for the advertisement. However, when the identifier is not included in the list of designated identifiers, the fraud detection system provides the advertisement in response to the request, and extracts a set of features from the request and other requests that originate from the source. The method also includes determining whether the identifier associated with the source is to be included in the list of designated identifiers based on the set of features in accordance with one or more models.

By one aspect of the present disclosure, there is provided a system for providing protection against fraudulent advertisement requests. The system includes a request handling unit implemented by at least one processor, and configured to receive a request for an advertisement. The system includes an extracting unit implemented by the at least one processor and configured to extract an identifier included in the request, the identifier being associated with a source from which the request originates. Further, the system includes an advertisement response unit implemented by the at least one processor and configured to: determine whether the extracted identifier is included in a list of designated identifiers. When the identifier is included in the list of designated identifiers, the advertisement response unit denies the request for the advertisement, and when the identifier is not included in the list of designated identifiers, the advertisement response unit provides the advertisement in response to the request, extracts a set of features from the request and other requests that originate from the source, and determines whether the identifier associated with the source is to be included in the list of designated identifiers based on the set of features in accordance with one or more models.

Other concepts relate to software for implementing the present teaching. A software product, in accordance with such concepts, includes at least one machine-readable non-transitory medium and information carried by the medium. The information carried by the medium may be executable program code data, parameters in association with the executable program code, and/or information related to a user, a request, content, or information related to a social group, etc.

One aspect of the present disclosure provides a non-transitory computer readable medium including computer executable instructions, wherein the instructions, when executed by a computer, cause the computer to perform a method for providing protection against fraudulent advertisement requests. The method includes the steps of: receiving a request for an advertisement; extracting an identifier included in the request, the identifier being associated with a source from which the request originates; and determining whether the extracted identifier is included in a list of designated identifiers. When the identifier is included in the list of designated identifiers, the method denies the request for the advertisement, and when the identifier is not included in the list of designated identifiers, the method is configured to providing the advertisement in response to the request, extract a set of features from the request and other requests that originate from the source, and determine whether the identifier associated with the source is to be included in the list of designated identifiers based on the set of features in accordance with one or more models.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 13 depicts the architecture of a computer which can be used to implement a specialized system incorporating the present teaching.

DETAILED DESCRIPTION

Figure 1:
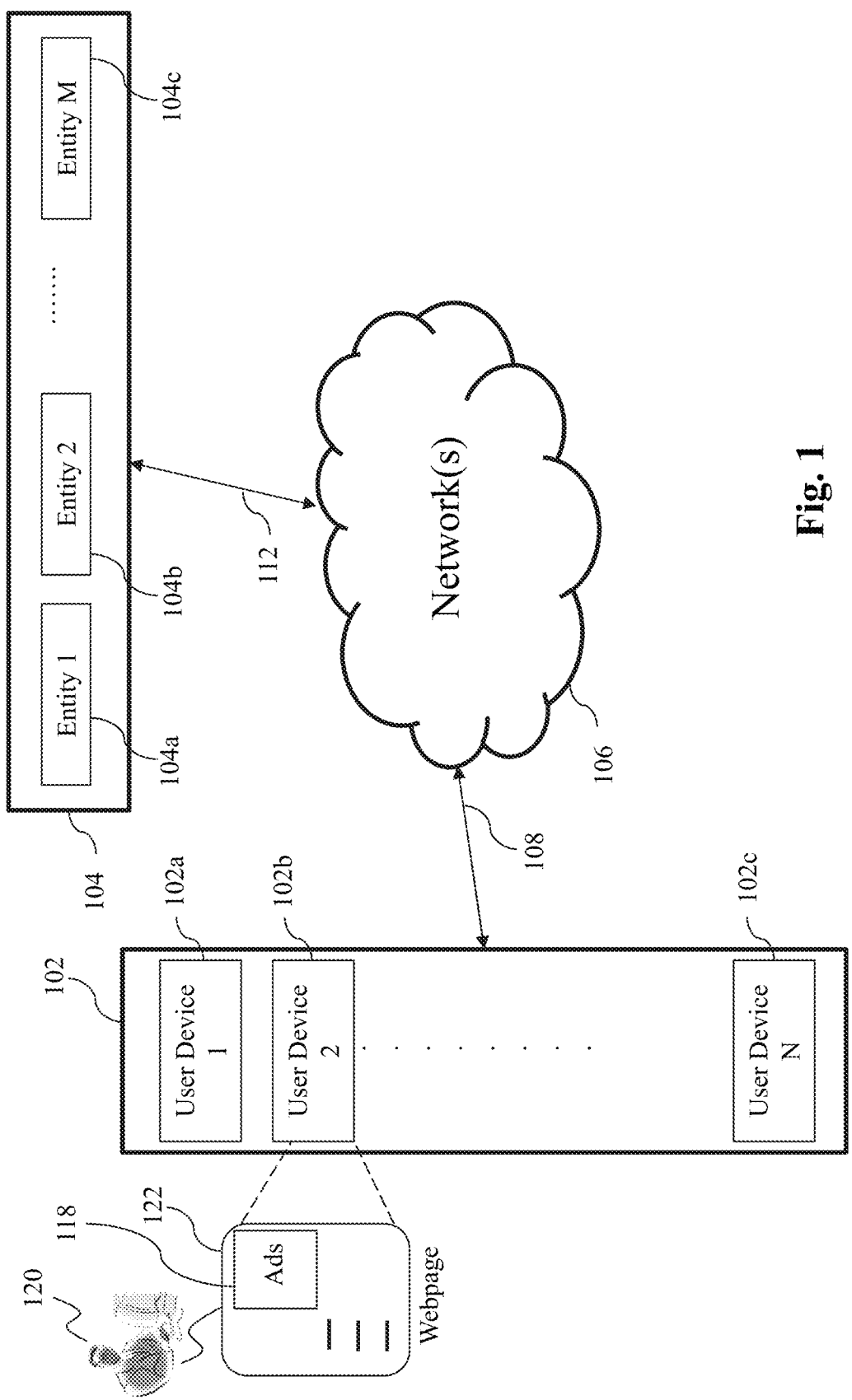
FIG. 1 is an illustrative diagram of an advertisement system in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Several types of fraudulent activities exist in the context of an ad-exchange. In the broad sense, fraud can be perceived as a means by which a member or members in the exchange try to increase their profits at the cost of other members in the exchange. A fraudster is simply a member of the exchange who is perpetrating fraud of some kind. The fraudster may be a publisher in the exchange who is attempting to make more money than it deserves, or an advertiser who is targeting other advertisers to reduce ad competition.

One kind of fraud referred to as impression spam involves fabricating HTTP requests to either the publisher's page, or the ad server directly, to artificially inflate the actual amount of traffic. This type of fraud targets what is generally referred to as cost-per-mille (CPM) deals, but may be mixed in with other types of fraud. One kind of fraud that is usually more profitable than impression spam alone is click spam, which is done by generating HTTP requests to advertisement click URLs, usually after an ad is served. Click inflation is the practice of publishers making more money than they deserve through inflating cost per click (CPC) deals, or increasing their click-through-rate (CTR). Competitor clicking is the practice of advertisers making false clicks against competitor's ads to deplete their advertising budget.

Several fraudulent activities are performed by malware that control compromised computers known as bots. By one embodiment, a network of such bots resides in a data center. One type of fraud committed by bots is a custom click-bot. Custom click-bots are custom software components developed by fraudsters that perpetrate a particular kind of fraud against certain publishers or advertisers. These click-bots normally reside on one or more static machines and issue HTTP requests to certain URLs to simulate impressions, clicks, or conversions. On the other hand, For-sale Click-bots are bots that are available for download or purchase and perform click fraud. The bots can be configured to perform many types of fraud and can be given lists of publishers' pages to visit, ads to click on, and proxies to use to diversify the bot's IP addresses.

Botnet-clickbots are the most difficult type of fraud to detect from an ad-exchange's perspective, and it is the most common source of fraudulent Internet ad-traffic. Botnets are unique in that the software required to perpetrate fraud is located on many benign users' machines. The malicious software usually comes in one of two flavors: those that run behind the scenes and act as normal clickbots, and those that attempt to coerce the user of the machine to perform some of the ad fraud actions. Fraudulent activities such as those describe above may be performed by bots that reside in a data center. In what follows, is described a framework for detecting such fraudulent activities originating from data centers.

FIG. 1 is an illustrative diagram of an exemplary advertisement system in accordance with various embodiments of the present teaching. In the non-limiting example, the advertisement system includes, in one embodiment, one or more user devices 102a, 102b, 102c, which collectively may be referred to as user device(s) 102. For example, user device(s) 102 may correspond to any suitable type of electronic device including, but are not limited to, desktop computers, mobile computers (e.g., laptops, Ultrabook's), mobile phones, smart phones, tablets, televisions, set top boxes, smart televisions, personal display devices, personal digital assistants ("PDAs"), gaming consoles and/or devices, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.).

In one embodiment, user device 102 may include a display screen 122, which is described in greater detail below with reference to FIG. 13, which may be capable of presenting content. For example, display screen 122 may display a webpage including one or more advertisements 118. The particular type of advertisement may be related to one or more of the content associated with the webpage, a user 120 viewing the content, a user profile associated with use 120, user interactions with user device 102 and/or any other devices and/or systems, a type of device that user device 102 corresponds to, and the like. Persons of ordinary skill in the art will recognize that a type of advertisement 118 and/or an amount of advertisements 118 displayed may be based on any suitable criteria, and the aforementioned is merely exemplary.

User 120 may cause, using user device 102, a request or a search query for online content to be sent to entities 104, and/or may receive content via the network(s) 106. The online content and ads may be provided and rendered on the user device. User 120 via user device 102 may interact with the rendered content and/or ads (e.g., clicking, dwelling, hovering on/over, tapping, swiping, scrolling, flicking, etc., the content and/or ads). Some user interactions may reflect the user's reaction to the content/ads displayed. For example, the user may click on ads 118, which may ultimately lead to a click through or conversion (e.g., a purchase made for a product/service advertised by ad 118). As another example, a dwell time may correspond to an amount of time that the user spent on ad 118 (e.g., detected by computing an amount of time during which the cursor, finger, or other input mechanism, dwells on ad 118) may indicate that the user is interested in the ad's content (e.g., a product/service being advertised).

The advertisement system of FIG. 1 may further include one or more entities, such as entity 104a, 104b, and 104c, which may collectively be referred to as entity/entities 104. The number of user devices (e.g., user devices 1-user devices N) and the number of entities (e.g., entity 1-entity M) may be the same or may differ, the present teaching is not limited in either case. Each entity corresponds to a provider of content for one or more of user devices 102. For example, entities 104 may correspond to an advertiser, an ad exchange, an intermediary system, and the like. Each entity 104 is configured to generate and send content to one or more of user devices 102 via one or more networks 106. The content (e.g., a webpage) may include information consumable by user 120, for instance, as well as one or more advertisements 118. In the illustrative embodiment, entities 104 may establish a communications link 112 with network(s) 106, which in turn provides the content to user devices 102 via a communications link 108. Furthermore, user devices 102 may communicate with entities 104, and/or any other suitable device/system, via communications links 108 (as well as 112).

Entities 104, in one embodiment, may correspond to a device/system operated by an individual, a firm, or an organization, which publishes or supplies content. For example, a blogger, television station, a newspaper issuer, a web page host, a content portal, an online service provider, and/or a game server may each correspond to an entity. In one embodiment, content sent to user devices 102 may be generated or formatted by entities 104 based on data provided by or retrieved from one or more content sources. A content source, as described herein, may correspond to an entity where the content was originally generated and/or stored. For example, an article may be originally printed in a magazine but then posted online at a web site controlled by a publisher.

Network(s) 106 may be a single network or a combination of different networks. For example, a network may be a local area network ("LAN"), a wide area network ("WAN"), a public network, a private network, a proprietary network, a Public Telephone Switched Network (PSTN), the Internet, a wireless network, a cellular network, a virtual network, or any combination thereof. A network may also include various network access points, (e.g., wired or wireless access points such as base stations or Internet exchange points) through which a data source may connect to the network(s) 106 in order to transmit information via network(s) 106, and a network node may connect to the network(s) 106 in order to receive information. In one embodiment, the network(s) 106 may correspond to an online advertising network or an ad network, which connects users to entities 104 or websites/mobile applications that desire to host or receive advertisements. An ad network may, for example, be a television ad network, a print ad network, an online (Internet) ad network, and/or a mobile ad network.

For a given online session in which a user 120 accesses online content provided by one of entities 104 via one of user devices 102, the online content may be presented and rendered on user device 102 with one or more advertisements. The number of advertisements may depend on a number/quantity of ad-space capable of being present with the online content. For each ad-space, entity 104 requests an advertisement from an ad server, and the ad selected is to be rendered in the intended online content's (e.g., webpage) ad-space. After obtaining the selected ads for each ad-space associated with the particular online content, entity 104 sends the online content including the corresponding selected ads to user device 102 so that the online content including the selected ads may be rendered via display 122.

In requesting an advertisement to be displayed to user device 102 with the online content (e.g., a webpage), entities 104 may provide contextual information related to the online content and/or the particular user (e.g., user 120) associated with the target user device 102. User activity events, such as, and without limitation, user interactions associated with an advertisement displayed with the online content, may also be monitored by a fraud detection system (described next with reference to FIG. 2) to identify potential fraudulent advertisement request activity.

Entities 104 may be configured to provide product(s) and/or service(s), and may be configured to handle the advertising process for its own product(s) and/or a service (e.g., websites, mobile applications, etc.) related to advertising, or a combination thereof. For example, entity 104 may include such systems as an advertising agency or a dealer of advertisement that operates a platform that connects an advertiser or advertising agency one or more additional entities.

Advertisements may be obtained from a plurality of sources, which may be stored within an advertisement database. Furthermore, different ads may be of different types, and online content may include one or more advertisements of two or more advertisement types. The various advertisement types may include, but are not limited to, streaming content, static content, sponsored content, and/or any combination thereof. For example, static content may include text, image, audio, or any rich media combination thereof. Each advertisement may be placed at any location of the online content (e.g., a content page, mobile app), and may be presented both as part of a content stream as well as a standalone advertisement, rendered strategically around or within the content stream. The various types of content sources may include, but are not limited to, online news, published papers, blogs, on-line tabloids, magazines, audio content, image content, and video content.

The content sources may alternatively, or additionally, correspond to a content portal presenting content originated from a content provider. The content obtained from such content sources may include, but is not limited to, multimedia content, text, or any other form of content comprised of website content, social media content, or any other content originator. The content further may be licensed content and/or content crawled and indexed from various sources on the Internet. Each ad may be stored with some textual information related to that ad, including a description of what that ad is about as well as additional information such as intended audience of the ad, which may be identified via such parameters as demographics of the intended audience, geographical locations where the ad is to be displayed, and/or time frame(s) when the ad is to be presented to the intended audience.

Figure 2:
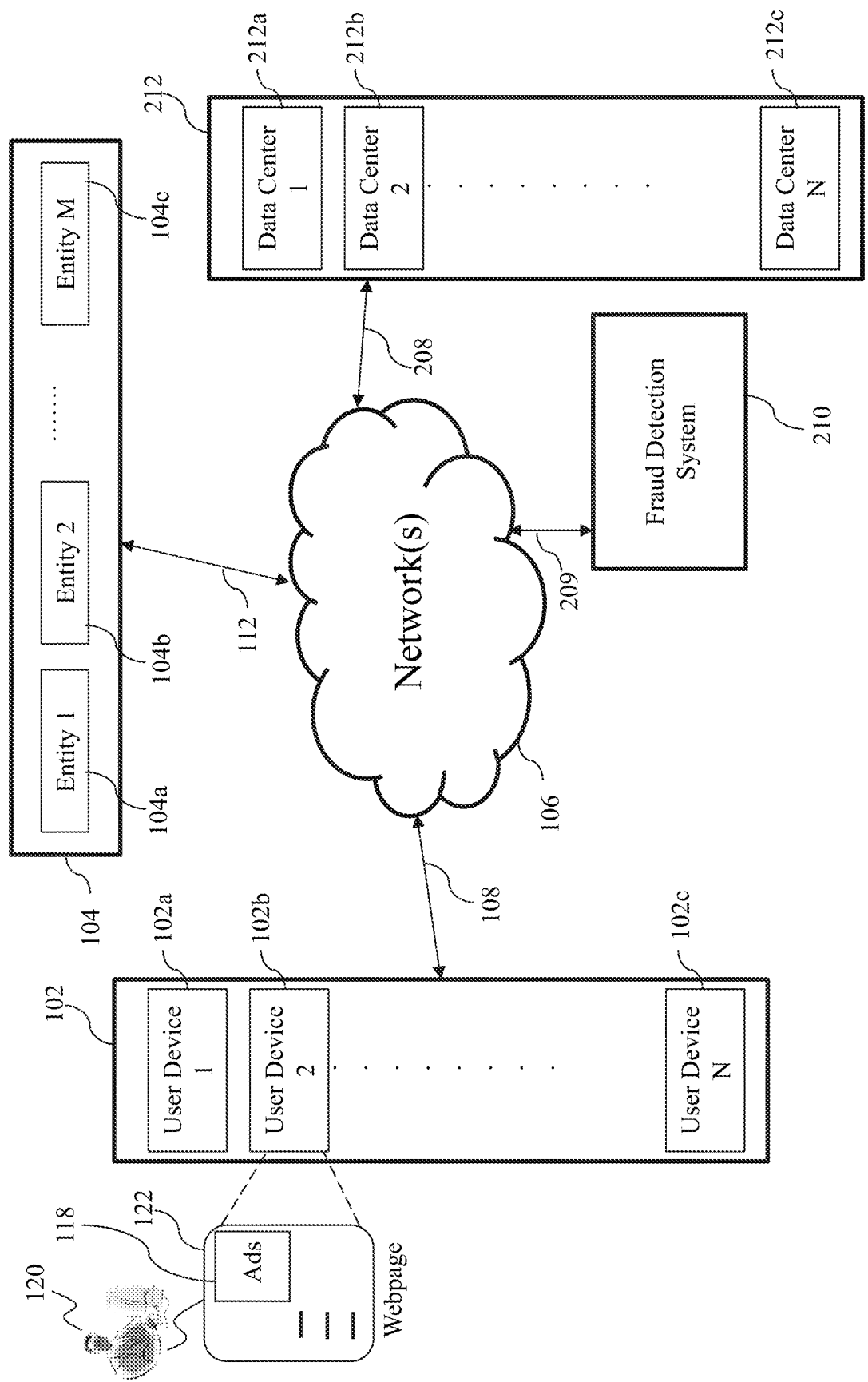
FIG. 2 is an illustrative diagram of an exemplary system for detecting fraudulent activities in the advertisement system, in accordance with various embodiments of the present teaching.

FIG. 2 depicts an illustrative diagram of an exemplary system for detecting fraudulent activities in an advertisement system, in accordance with various embodiments of the present teaching. The advertisement system of FIG. 2 includes user devices 102, entities 104, a network 106, a fraud detection system 210, and a plurality of data centers 212a, 212b, and 212c. The user devices 102, entities 104, and network 106 are similar to those as described in FIG. 1. Accordingly, for the sake of brevity, a description of these components is not repeated herein.

By one embodiment, each of the plurality of data centers 212a, 212b, and 212c (collectively referred to as data center 212) represent a cluster of bots that may perform fraudulent activities such as custom clicking, for-sale clicking, and the like activities as previously described. The fraud detection system 210, which is described in greater detail below, may be, in one embodiment, configured to analyze ad-related activity originating from each of the data centers 212. In determining whether activity associated with a particular data center 212 is a fraudulent activity, the fraud detection system performs processing and analysis of each request originating from the data center. Alternatively, by one embodiment, bots are usually related to each other, and deployed as a botnet or Internet-Protocol (IP)-cluster. In the particular case of data center bots, the bots may be deployed on cloud servers, web-hosting servers and the like. Accordingly, in one embodiment, the fraud detection system is configured to operate in a manner such that fraud detection system 210 analyzes bot behavior of an IP group instead of an individual IP address, and thus provides an aggregate level of information pertaining to the bots. As shown in FIG. 2, the data centers 212 communicate with the network 106 via communication link 208, whereas the fraud detection system 210 communicates with the network 106 via link 209. It must be appreciated that the fraud detection system 210 can be deployed as an independent service in relation to the entities 104 or may function as a backend sub-system for entities 104.

Figure 3:
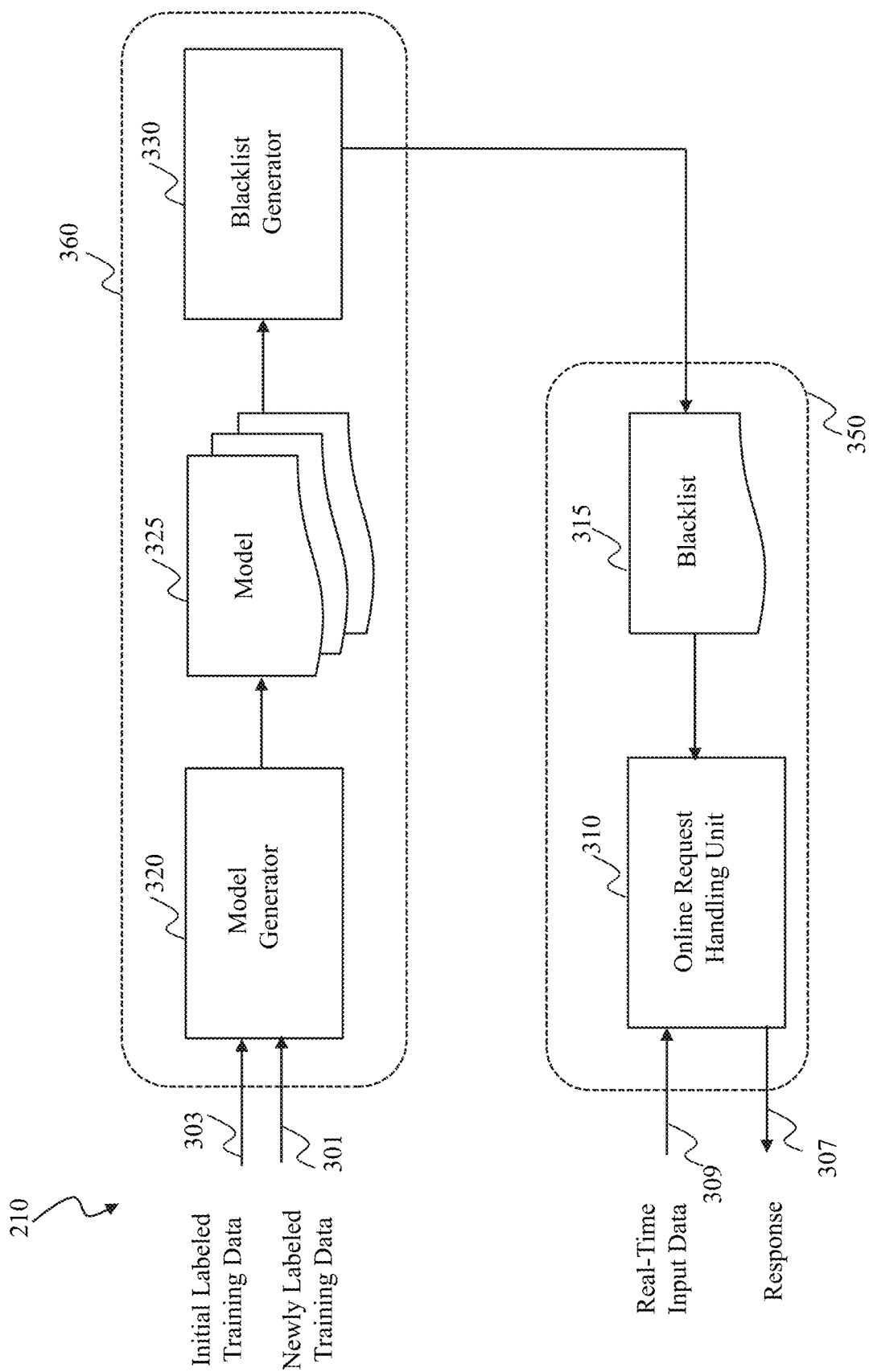
FIG. 3 depicts an exemplary fraud detection system in accordance with various embodiments of the present teaching.

FIG. 3 depicts an exemplary fraud detection system 210 in accordance with various embodiments of the present teaching. The fraud detection system 210 includes an online data-processing portion 350, and an offline data-processing portion 360. The online data-processing portion includes an online request handling unit 310 and a backlist 315. The offline data-processing portion includes a model generator 320, a model 325, and a blacklist generator 330. The model generator 320 receives as input, initial labeled training data 303 and newly labeled training data 301. Details regarding the model generator 320 are described later with reference to FIG. 8, and details regarding the blacklist generator 330 are described later with reference to FIG. 6.

In some embodiments, the online request handling unit 310 receives a request (depicted as real-time input data 309) for an advertisement from a source such as a user device or a data-center. Upon receiving the request, the online request handling unit 310 extracts an identifier included in the request. The identifier may be for instance, an IP address associated with a source from where the request originated. The online request handling unit 310 processes the extracted identifier with respect to the blacklist 315 in order to generate a response 307 to the request 309.

In some embodiments, the blacklist 315 includes a list of designated identifiers corresponding to respective sources, which have previously been determined by the fraud detection system 210 to be sources that have committed some sought of ad-related fraudulent activity. The online request handling unit 310 determines whether the extracted identifier (of the current request under consideration) is included in the list of designated identifiers (i.e., the blacklist). If the extracted identifier that is associated with the source of the current request is included in the blacklist, the online request handling unit generates a response 307 which denies the request for advertisement to the source.

In contrast, if the extracted identifier is not included in the blacklist, the online request handling unit 310 temporarily provides the advertisement in response to the request, and logs the request in a database for further processing. Specifically, as described later with reference to FIG. 6, the fraud detection system 210 processes, in an offline manner, the logged request to determine whether the identifier associated with the source of the current request is to be included in the blacklist 315. It must be appreciated that while processing an input request 309 at a certain time instant, the online request handling unit 310 utilizes the blacklist 315 (to determine whether advertisement is to be granted or denied to the request) that is generated by the blacklist generator 330 until that time instant. As described later with reference to FIG. 6, the blacklist generator 330 may further update the blacklist 315 based on the additional processing of the logged request.

The offline data processing portion 360 which includes the model generator 320, the model 325 and the blacklist generator 330 that are configured to update the blacklist 315 in a dynamic manner based on initial training data 303 and newly labeled training data 301. Further details regarding the update of the blacklist are described later with reference to FIG. 8.

Figure 4:
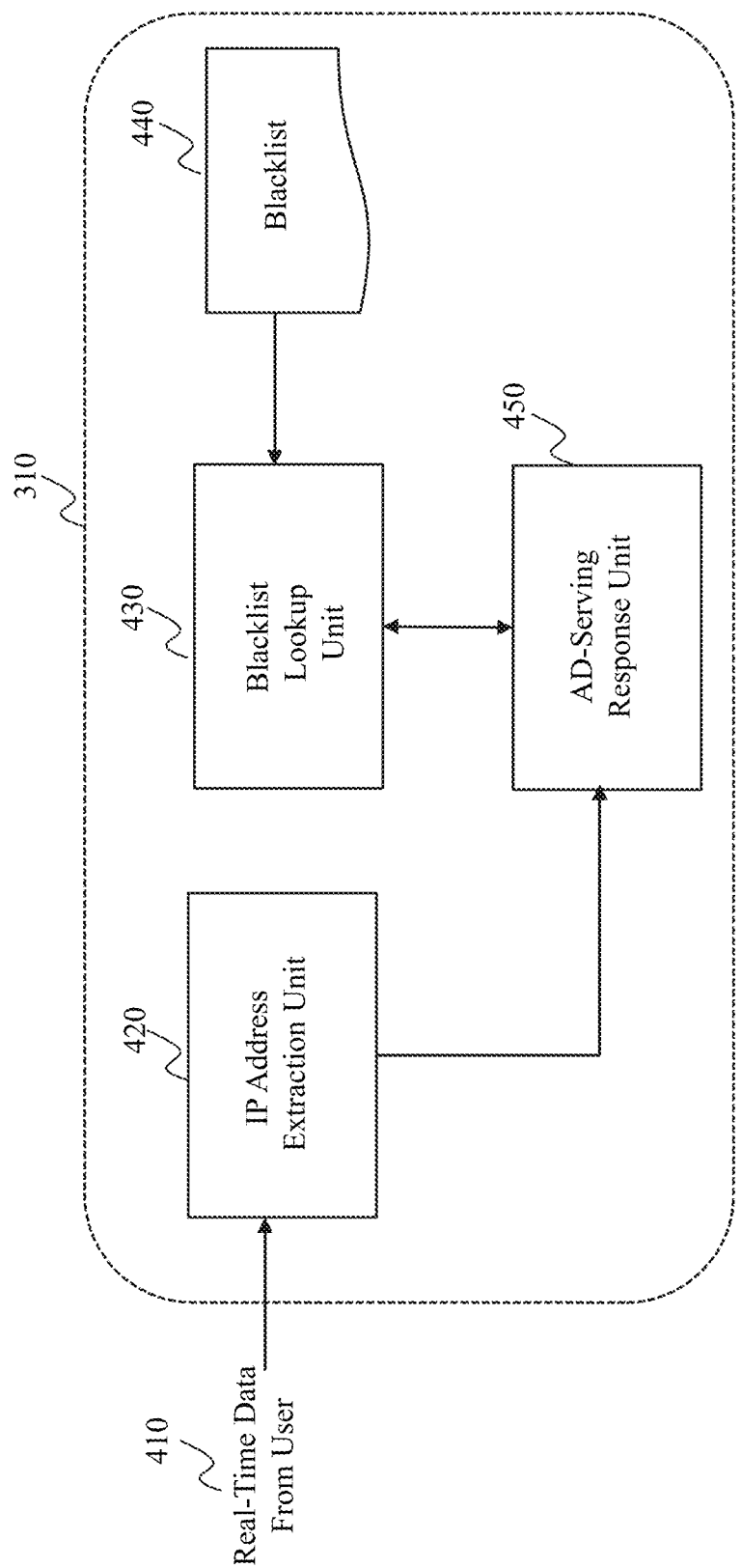
FIG. 4 depicts an exemplary request handling unit included in the fraud detection system in accordance with various embodiments of the present teaching.

FIG. 4 depicts an exemplary request handling unit 310 of a fraud detection system in accordance with various embodiments of the present teaching. The request handling unit includes an IP address extraction unit 420, an ad-serving response unit 450, a blacklist look-up unit 430, and a blacklist 440.

The input to the request handling unit is a request for an advertisement 410 from a user. Upon receiving the receiving the request 410, the IP extraction unit 420 extracts an IP address associated with the request. The extracted IP address enables the request handling unit to determine a source (e.g., user device, a data center, etc.) from where the request originated.

Upon extracting the IP address, the online request handling unit activates an Ad-serving response unit 450 which is configured to generate a response to the request. By one embodiment, the ad-serving response unit 450 triggers a blacklist look-up unit 430 in order to generate the response. The blacklist look-up unit 430 accesses a blacklist 440 to determine whether the extracted IP address is included in a list of IP addresses stored in the blacklist. By one embodiment, to perform the search of the extracted IP address within the blacklist in an efficient manner, the blacklist look-up unit 430 performs a real-time look-up of the extracted address in the list of designated addresses, wherein each address in the list is stored as a classless inter-domain routing (CIDR) IP identifier. Moreover, to perform the search in a time-efficient manner, the list of CIDR IP addresses is maintained in a radix tree format. Using the CIDR address representation for the IP addresses and maintaining the list of IP addresses in a Radix tree type of topology provides the advantageous ability of providing a faster lookup of the address while being memory efficient.

Figure 5:
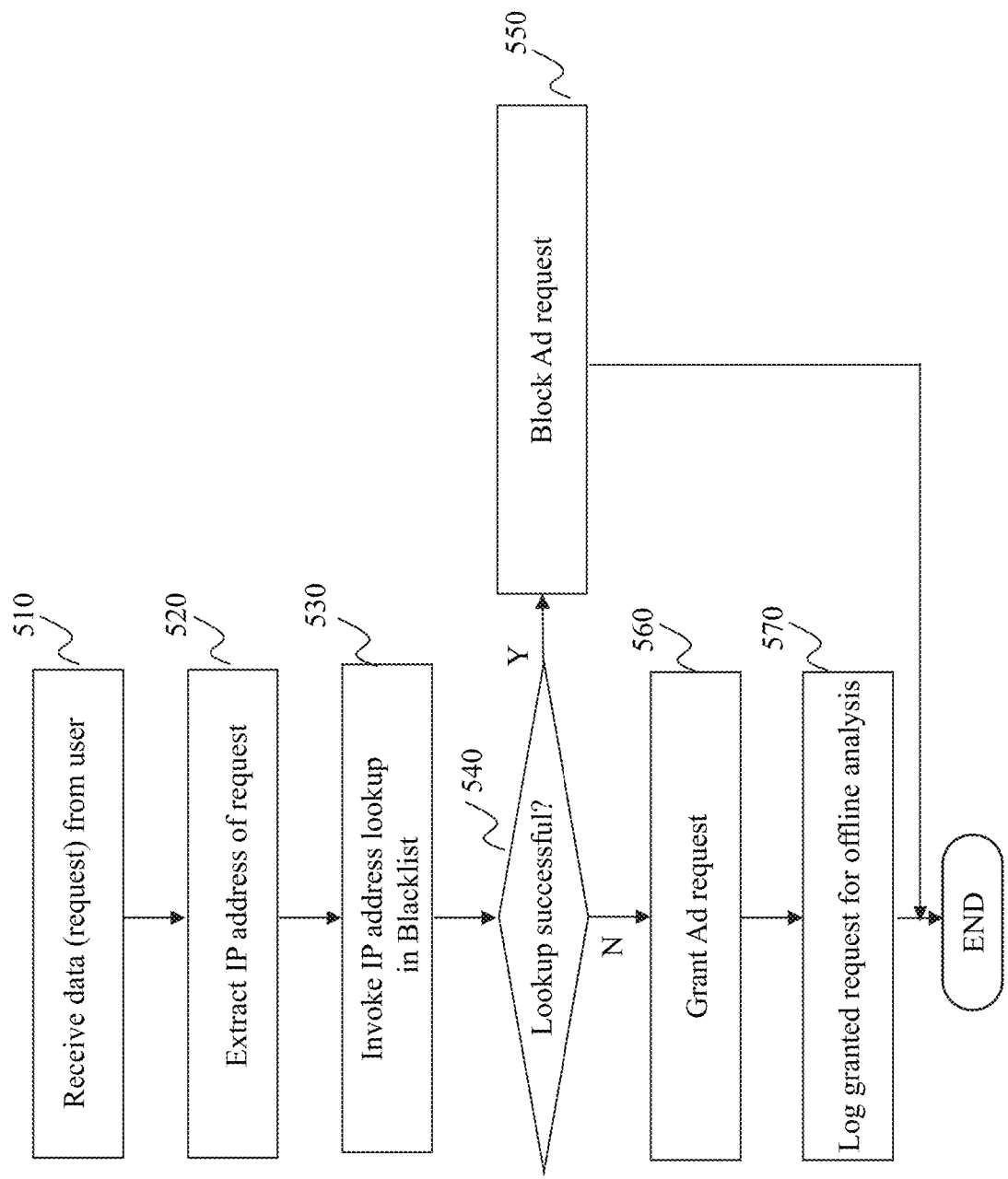
FIG. 5 depicts an illustrative flowchart of an exemplary process performed by the request handling unit of the fraud detection system, in accordance with an embodiment of the present teaching.

FIG. 5 depicts an illustrative flowchart of an exemplary process performed by the request handling unit of the fraud detection system.

The process commences in step 510, wherein the request handling unit receives a request for an advertisement from a user. In step 520, an identifier (e.g., IP address) associated with the request is extracted. The extracted identifier enables the request handling unit to determine a source (e.g., user-device, a data center etc.) from where the request originated.

The process further moves to step 530, wherein the request handling unit invokes an identifier look-up process in a blacklist. Further, in step 540 a query is performed to determine whether the lookup is successful. If the response to the query is affirmative, the process moves to step 550. However, if the response to the query of step 540 is negative, the process moves to step 560.

In step 550, the request handling unit denies (i.e., blocks) the advertisement request as the extracted identifier of the source of the request is included in the blacklist. It must be appreciated that the blacklist maintains a list of designated identifiers corresponding to various sources which have been previously determined by the fraud detection system, as being sources, which have been determined to participate in fraudulent ad-related activities. Upon blocking the ad-request in step 550, the process terminates.

However, if the response to the query in step 540 is negative, the process moves to step 560, wherein the request handling unit temporarily grants the advertisement request to the user. Further, the process moves to step 570, wherein the request handling unit creates a logged entry of the granted request for offline analysis. The processing of the logged request is described next with reference to FIG. 6. Upon logging the entry of the request, the process as depicted in FIG. 5 terminates.

Figure 6:
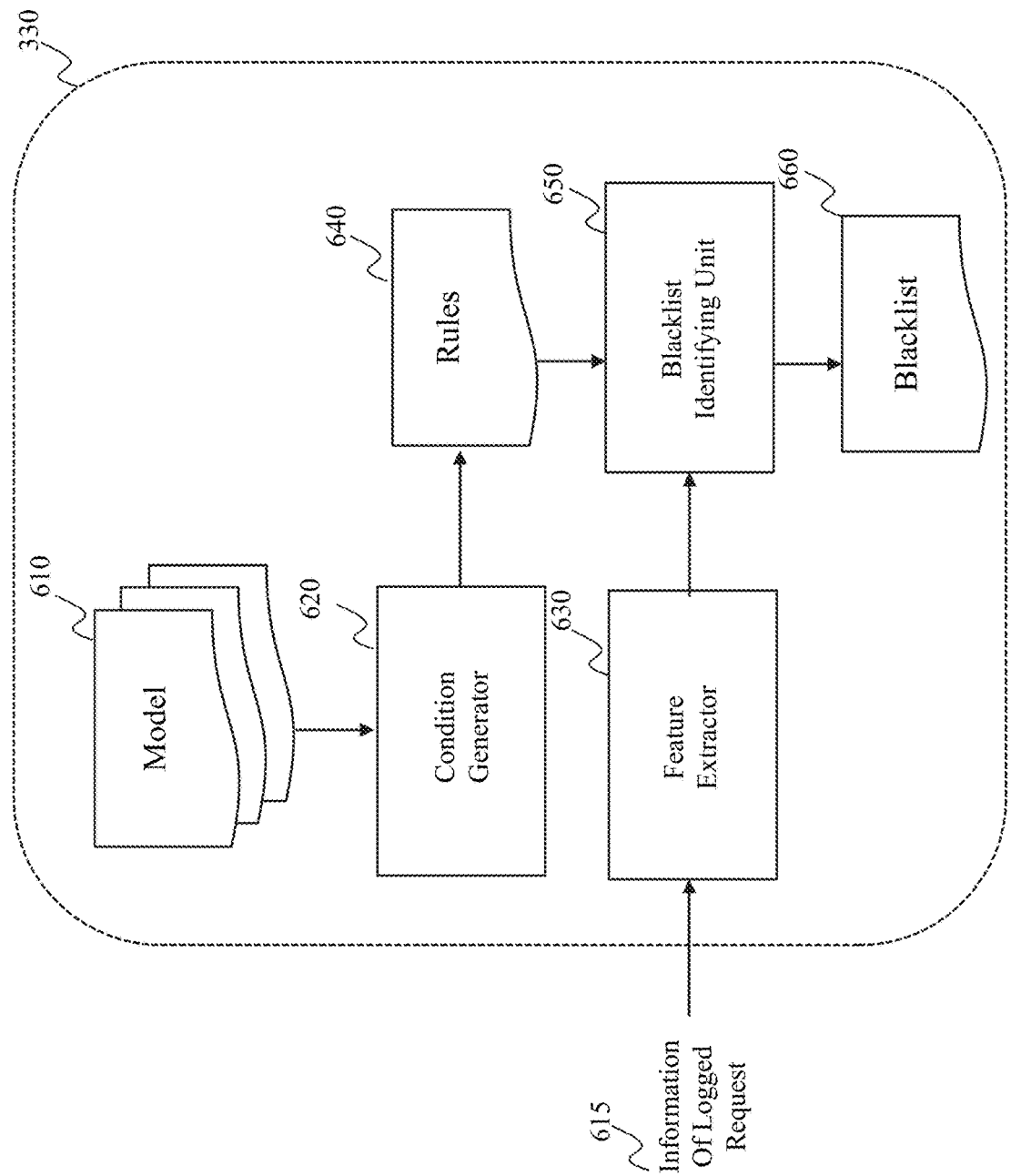
FIG. 6 depicts an exemplary blacklist generator of the fraud detection system in accordance with various embodiments of the present teaching.

FIG. 6 depicts an exemplary blacklist generator 330 of the fraud detection system in accordance with various embodiments of the present teaching. The blacklist generator 330 includes a machine learning model 610, a condition generator 620, a set of rules 640, a feature extractor 630, a blacklist identifying unit 650, and a blacklist 660.

Figure 10:
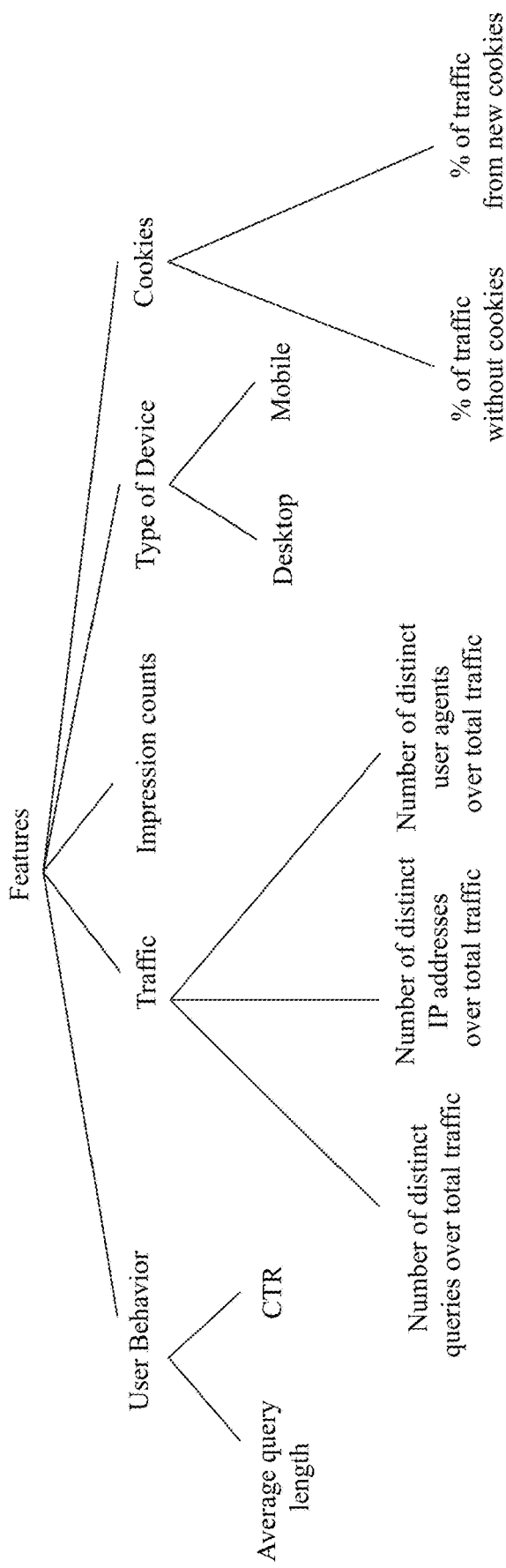
FIG. 10 depicts an illustrative graph depicting the various features associated with user request in accordance with various embodiments of the present teaching.

In some embodiments, the machine learning model 610 may be a gradient boosting machine that implements for instance, a gradient boosting decision tree algorithm. The model 610 invokes a condition generator 620 that generates boundary conditions with respect to each feature extracted from previous requests. FIG. 10 depicts an illustrative graph depicting the various features associated with user request in accordance with various embodiments of the present teaching. As shown in FIG. 10, the features corresponding to each request may be categorized based on a user behavior, traffic, impression counts, a type of device from which the request originates, cookies associated with the request, a type of browser utilized by the user etc.

The user behavior feature may be further categorized based on an average query length of the request and a click through rate (CTR), whereas the traffic feature may be categorized based on a number of distinct queries with respect to total traffic, a number of distinct IP addresses extracted over the total traffic, and number of unique user agents over the total traffic. The feature type of device may indicate whether the ad-request originated from a desktop machine or a mobile device.

Returning to FIG. 6, for each feature, the condition generator may determine boundary condition that includes a range represented by a lower limit and an upper limit. Accordingly, by one embodiment, the condition generator 620 may aggregate a predetermined number of features (e.g., n features) to generate a rule. Each rule established in such a manner, creates a region within an n-dimensional space that denotes non-fraudulent activity. Thus, by considering a plurality of rules, the n-dimensional space includes a plurality of regions which are deemed to correspond to non-fraudulent activity.

The feature extractor 630 of the blacklist generator retrieves information of a logged request. Further, the feature extractor extracts a set of features corresponding to the logged request and transmits the extracted features to a blacklist identifying unit 650. The blacklist identifying unit 650 compares values of the extracted features (corresponding to the logged request) with the set of rules (i.e. boundary conditions) to determine whether the source associated with the logged request is to be deemed as a fraudulent source. For instance, if the extracted values of the features corresponding to the logged request lie in a region within the n-dimensional space which has been determined to correspond to non-fraudulent activity, the source associated with the logged request is determined to be a non-fraudulent source.

In contrast, if the extracted values of the features corresponding to the logged request lie outside a region that has been determined to correspond to non-fraudulent activity, the source associated with the logged request is determined to be a fraudulent source, where after the blacklist identifying unit 650 includes an identifier of the source (e.g., the IP address of the source) in the blacklist 660.

It must be appreciated that the set of rules can be generated in a manner such that the regions in the n-dimensional space correspond to fraudulent activity. In such a setting, when the extracted values of the features of the logged request lie within the region, the source associated with the logged request is deemed as a fraudulent source. By one embodiment, while determining whether the source associated with the logged request is a fraudulent or non-fraudulent source, the fraud detection system may compare the extracted features of the logged request to the features of previous requests that have originated from that source. In this setting, note that the rules may be generated solely based on the previous requests that have originated from the particular source.

Figure 7:
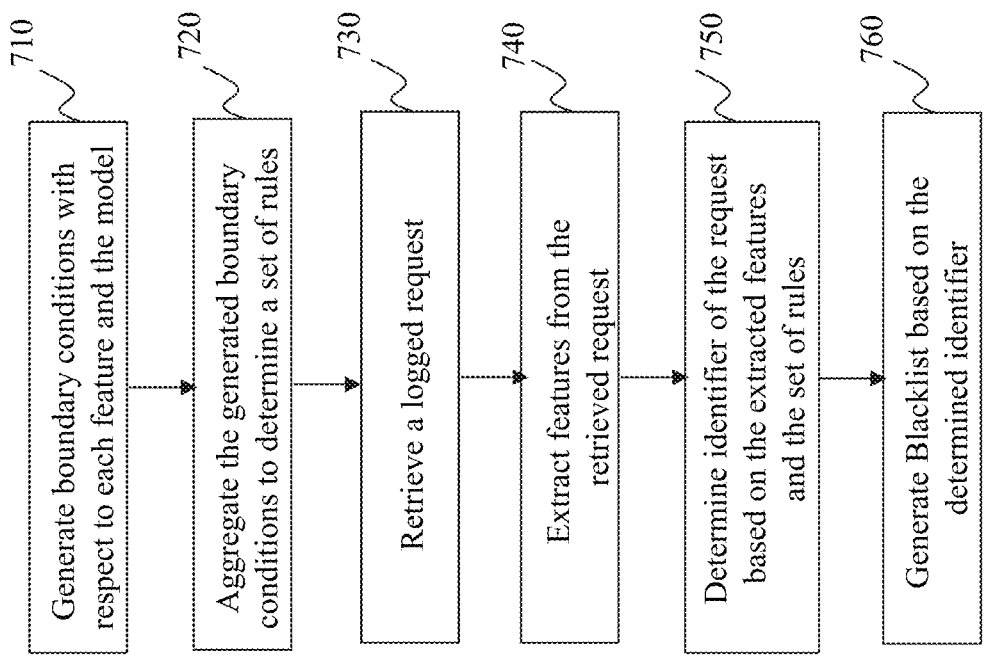
FIG. 7 depicts an illustrative flowchart of an exemplary process performed by the blacklist generator of the fraud detection system, in accordance with an embodiment of the present teaching.

FIG. 7 depicts an illustrative flowchart of an exemplary process performed by a blacklist generator of the fraud detection system.

The process commences in step 710, wherein the blacklist generator generates boundary conditions with respect to each feature associated with the requests and the machine learning model. In step 720, the blacklist generator aggregates the generated boundary conditions to determine a set of rules. It must be appreciated that each rule can encapsulate a plurality of features.

The process in step 730 retrieves a logged request and extracts features from the retrieved request in step 740. Further, in step 750, the blacklist generator determines an identifier of the request based on the extracted features and the set of rules. Specifically, the blacklist generator determines whether the extracted features from the logged request satisfy or violate the set of rules. If the extracted features violate the set of rules, the blacklist generator determines an identifier (e.g. an IP address) of the source of the request. Further, the process in step 760 includes the determined identifier of the source of the request in the blacklist. In this manner, the blacklist generator generates and updates the blacklist which includes a list of designated identifiers that are deemed to be fraudulent sources.

Figure 8:
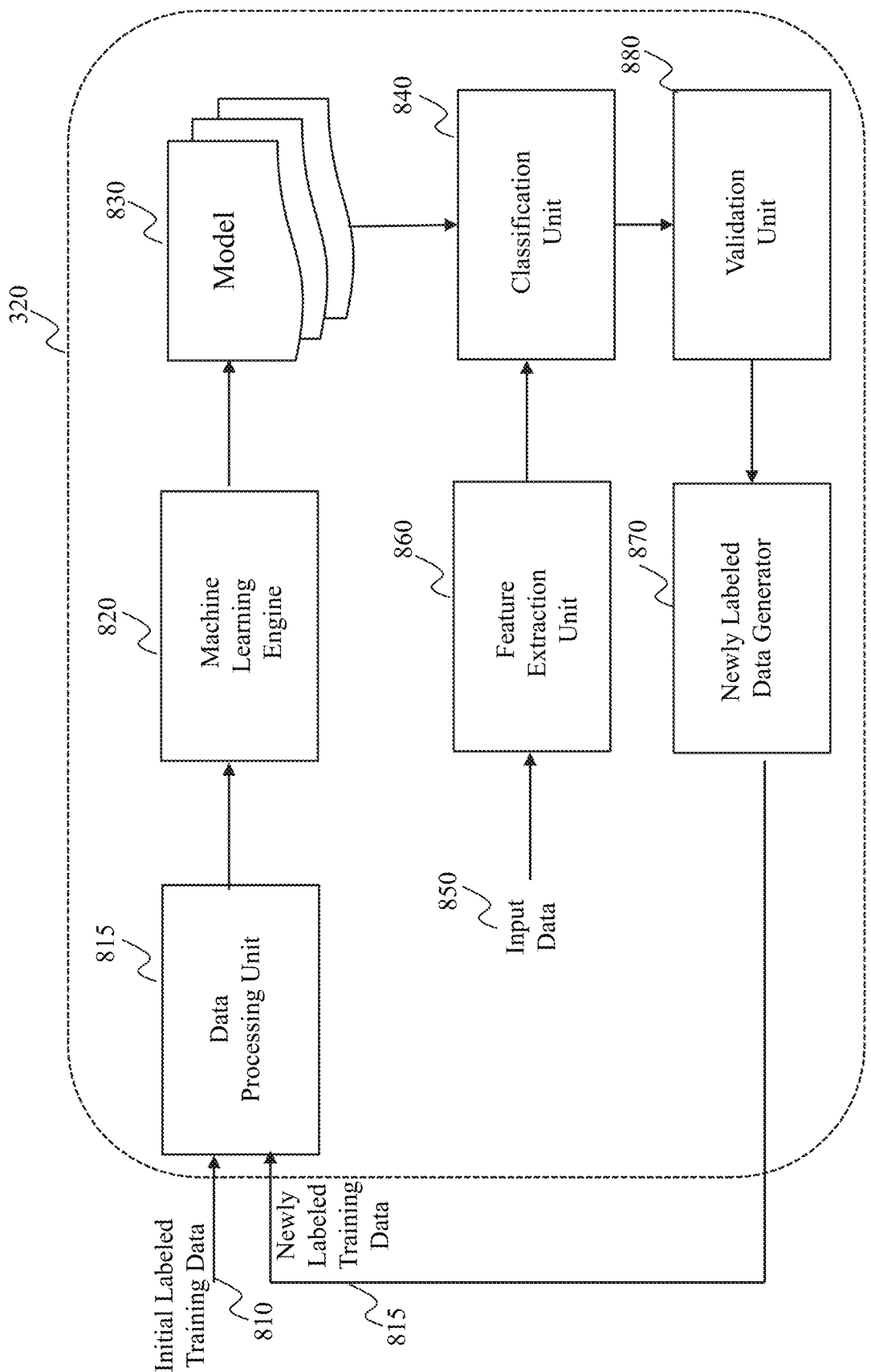
FIG. 8 depicts an exemplary model generator of the fraud detection system in accordance with various embodiments of the present teaching.

FIG. 8 depicts an exemplary model generator 320 of the fraud detection system in accordance with various embodiments of the present teaching. The model generator 320 includes a data processing unit 815, a machine learning engine 820, a model 830, a feature extraction unit 860, a classification unit 840, a validation unit 880, and a newly labeled data generator 870.

The feature extraction unit 860 retrieves a logged request and extracts features corresponding to the request. The extracted features are classified by the classification unit 840 based on the set of rules and the model 830 that is developed thus far (i.e., at a time instance corresponding to the time when the logged request is retrieved.). By one embodiment, the classification unit 840 can categorize the logged request as a request originating from a fraudulent (or alternatively, a non-fraudulent) source based on the rules generated by the model 830 and the extracted values of the features corresponding to the logged request.

Upon classification of the logged request, a validation unit 880 may optionally verify the classification. By one embodiment, the validation unit may include human validation wherein a human operator verifies the classification of the extracted features. Alternatively, the validation may be performed in an autonomous manner by techniques known to one of ordinary skill in the art.

Upon classification (and validation), the newly labeled data generator 870 may potentially extract new labels from the extracted features. The newly extracted labels serve as new training data 815. By one embodiment, the newly labeled training data 815 along with the initial labeled training data 810 serve as inputs to the data processing unit 815.

By one embodiment, the data processing unit 815 may be configured to process the initial (i.e., previously processed) training data 810 and newly labeled training data 815 to generate (or update) a set of rules as described previously with reference to FIG. 6. The machine learning engine 820 processes the updated (or newly generated rules) and updates the machine learning model 830 in a semi-supervised fashion. The updated model 830 is then used to process further logged request of the fraud detection system.

Figure 9:
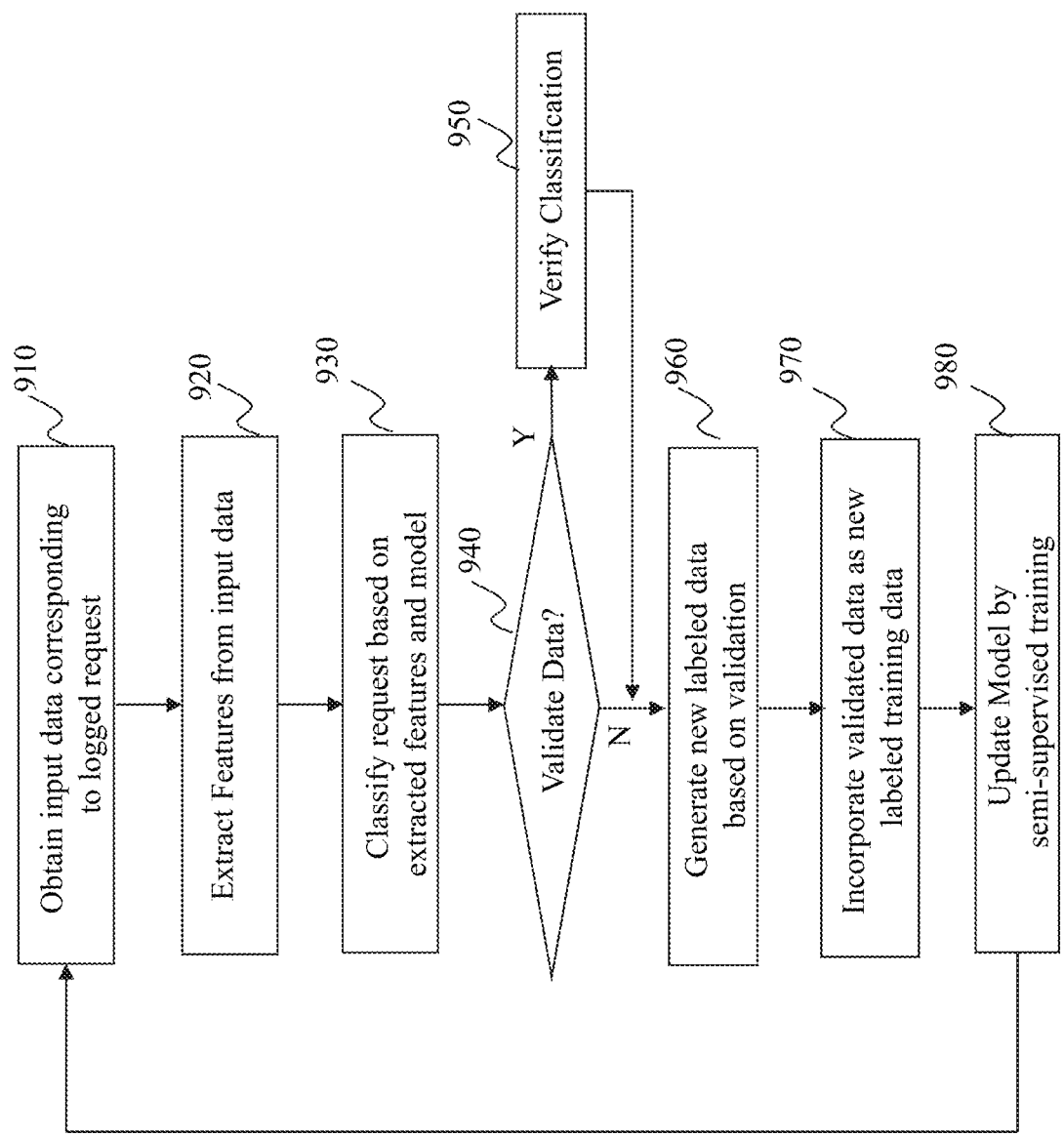
FIG. 9 depicts an illustrative flowchart of an exemplary process performed by the model generator of the fraud detection system, in accordance with an embodiment of the present teaching.

FIG. 9 depicts an illustrative flowchart of an exemplary process performed by the model generator of the fraud detection system in accordance with various embodiments of the present teaching.

The process commences in step 910 wherein the model generator obtains data corresponding to a logged request. Note that the logged request is a request, which was temporarily provided the advertisement by the online request handling unit. The online request handling unit maintains a log of temporarily granted requests to determine (in an offline manner) whether the advertisement should be continued to be provided to the request, or whether an identifier associated with the source from where the request originated is to be included in the blacklist.

The process in step 920 extracts features from the retrieved request. In step 930, based on the extracted features and the machine learning model, the retrieved request is classified as one where the source of the request is to be deemed as a fraudulent source or a non-fraudulent source. In step 940, a query is performed to determine whether validation of the classified request is to be performed. If the response to the query is affirmative, the process moves to step 950, else if the response to the query is negative, the process moves to step 960.

In step 960, validation of the classified request is performed where after the process moves to step 960. The process in step 960 generates new labeled data (corresponding to the classified request) based on the extracted features of the request. The process then moves to step 970 wherein the newly labeled data is incorporated in the machine learning engine as new training data. In step 980, the machine learning engine updates the model, based on the newly labeled data and initial labeled data. Thereafter, the process loops back to step 910 and repeats the process illustrated in FIG. 9. In this manner, the process of FIG. 9 updates the model in a semi-supervised manner.

Figure 11:
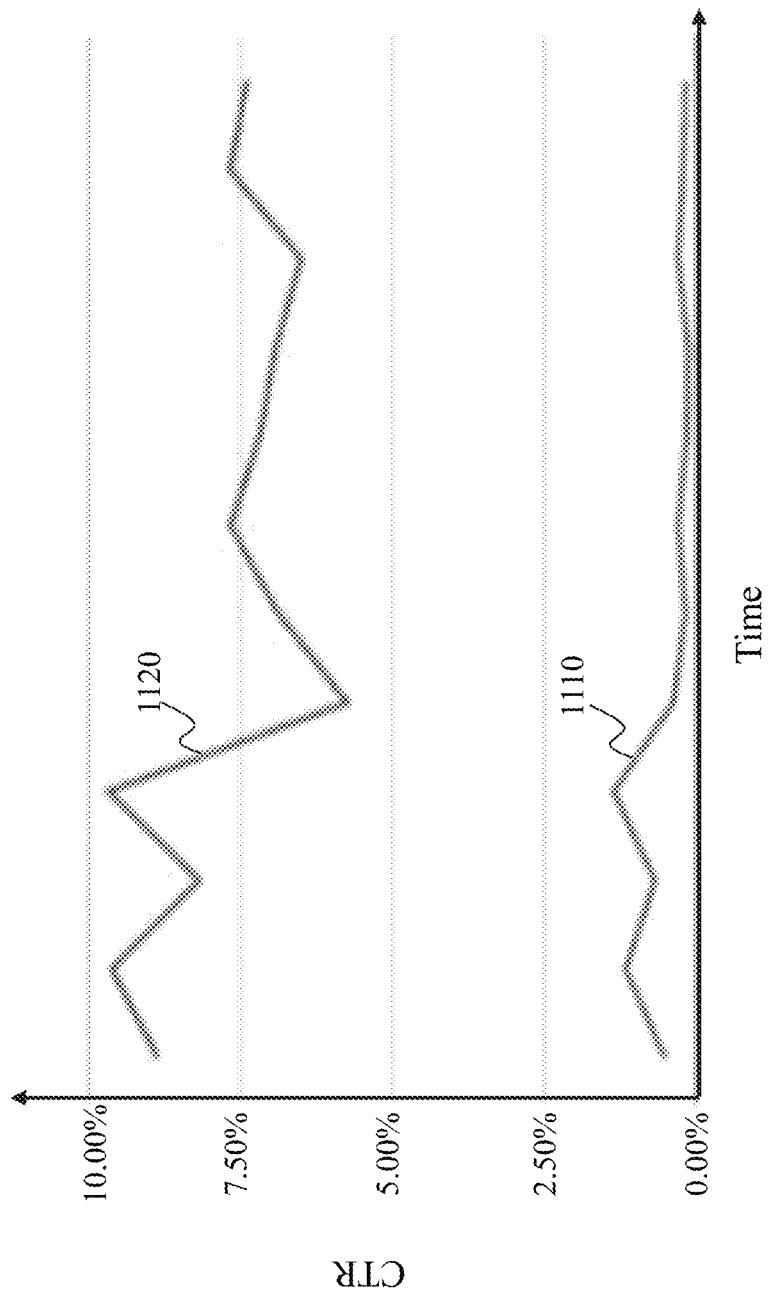
FIG. 11 depicts an exemplary graph illustrating the effects of preventing fraudulent sources in a network, in accordance with an embodiment of the present teaching.

FIG. 11 depicts a graph illustrating the effects of detecting and further restricting a fraudulent advertisement source from accessing the advertisement network. Specifically, FIG. 11 depicts a graph illustrating a click through rate (CTR) performance of advertisement requests originating in a geographical area. FIG. 11 depicts a first curve 1110, which corresponds to a scenario of having a low CTR. Such a scenario is encountered due to bots (i.e., robot software crawlers) that abuse the advertisement requests. Upon implementing the fraud detection system described herein to deny advertisement requests to fraudulent sources, the CTR of the geographical region return to a normal range (approximately 7.5%) as shown by curve 1120.

Figure 12:
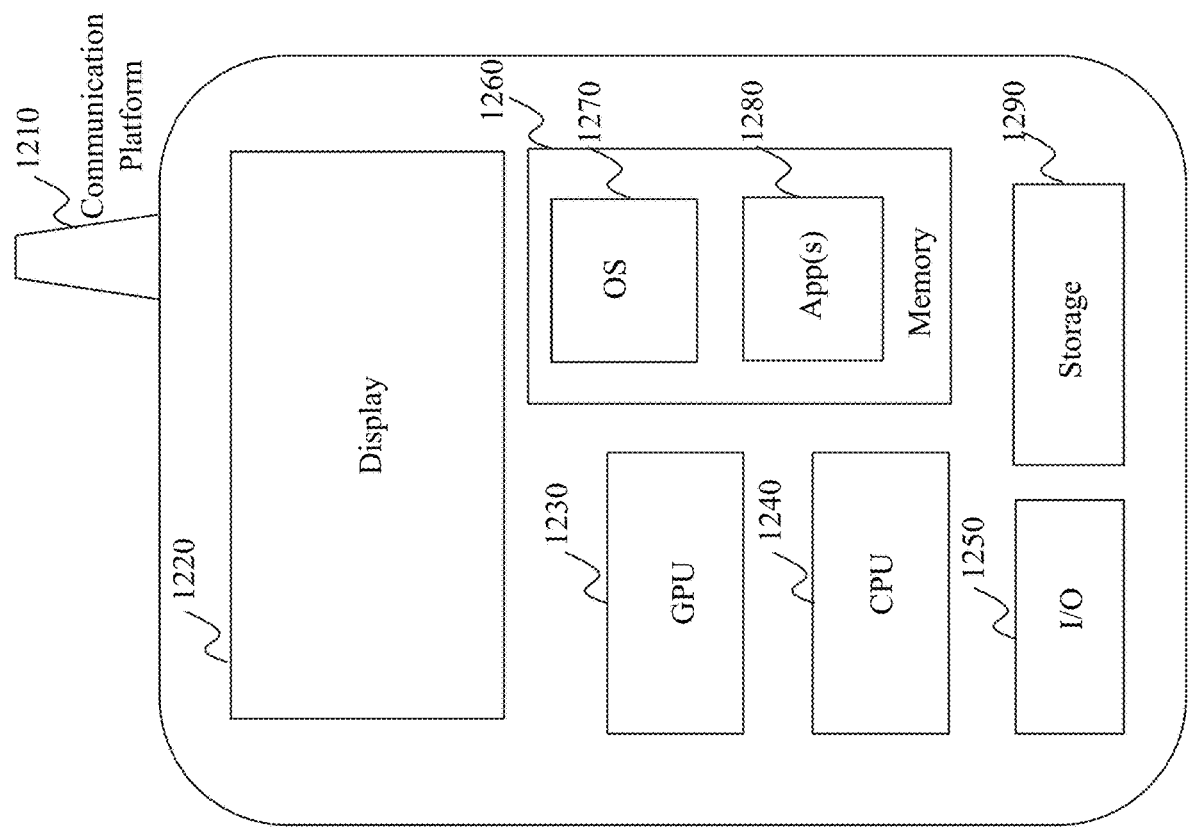
FIG. 12 depicts an architecture of a mobile device which can be used to implement a specialized system incorporating the present teaching.

Turning now to FIG. 12, there is depicted an architecture of a mobile device 1200 which can be used to realize a specialized system implementing the present teaching. In this example, the user device on which content and advertisement are presented and interacted-with is a mobile device 1200, including, but is not limited to, a smart phone, a tablet, a music player, a handled gaming console, a global positioning system (GPS) receiver, and a wearable computing device (e.g., eyeglasses, wrist watch, etc.), or in any other form factor. Additionally, the mobile device 1200 can be used to implement the functionalities of the fraud detection system 210 as described herein.

The mobile device 1200 in this example includes one or more central processing units (CPUs) 1240, one or more graphic processing units (GPUs) 1230, a display 1220, a memory 1260, a communication platform 1210, such as a wireless communication module, storage 1290, and one or more input/output (I/O) devices 1250. Any other suitable component, including but not limited to a system bus or a controller (not shown), may also be included in the mobile device 1200. As shown in FIG. 12, a mobile operating system 1270, e.g., iOS, Android, Windows Phone, etc., and one or more applications 1280 may be loaded into the memory 1260 from the storage 1290 in order to be executed by the CPU 1240. The applications 1280 may include a browser or any other suitable mobile apps for receiving and rendering content streams and advertisements on the mobile device 1200. User interactions with the content streams and advertisements may be achieved via the I/O devices 1250

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to explore fraud detecting functionalities. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

FIG. 13 is an illustrative diagram of an exemplary computer system architecture, in accordance with various embodiments of the present teaching. Such a specialized system incorporating the present teaching has a functional block diagram illustration of a hardware platform which includes user interface elements. Computer 1300 may be a general purpose computer or a special purpose computer. Both can be used to implement a specialized system for the present teaching. Computer 1300 may be used to implement any component of the fraud detection system, as described herein. For example, the fraud detection system 210 may be implemented on a computer such as computer 1300 via its hardware, software program, firmware, or a combination thereof. Although only one such computer is shown, for convenience, the computer functions relating to fraud detection systems for detecting abnormal traffic activity described herein may be implemented in a distributed fashion on a number of similar platforms, to distribute the processing load.

Computer 1300, for example, may include communication ports 1350 connected to and from a network connected thereto to facilitate data communications. Computer 1300 also includes a central processing unit (CPU) 1320, in the form of one or more processors, for executing program instructions. The exemplary computer platform may also include an internal communication bus 1310, program storage and data storage of different forms (e.g., disk 1370, read only memory (ROM) 1330, or random access memory (RAM) 1340), for various data files to be processed and/or communicated by computer 1300, as well as possibly program instructions to be executed by CPU 1320. Computer 1300 may also include an I/O component 1360 supporting input/output flows between the computer and other components therein such as user interface elements 1380. Computer 1300 may also receive programming and data via network communications.

Hence, aspects of the methods for providing protection against fraudulent advertisement requests, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of fraud activity detection system into the hardware platform(s) of a computing environment or other system implementing a computing environment or similar functionalities in connection with fraud activity detection. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraud activity detection system, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for providing protection against fraudulent advertisement requests, the method comprising:
 determining, via machine learning, a list of designated identifiers of fraudulent sources of requests for advertisements by:
  creating a multiple dimensional space including multiple regions that denote non-fraudulent activities, wherein multiple rules are determined based on multiple features of a user request, and wherein each of the multiple regions is created based on each of the rules including upper and lower limits of a value of a corresponding one of multiple features of a user request,
  extracting features from logged requests for advertisements from fraudulent sources and non-fraudulent sources, and
  if the extracted features lie outside the regions, including identifiers of the fraudulent sources into the list of designated identifiers of the fraudulent sources of requests for advertisements;
 receiving, by a request handling unit implemented by the at least one processor, a request for an advertisement;
 extracting, by the request handling unit, an identifier included in the request, the identifier being associated with a source from which the request originates;
 determining whether the extracted identifier is included in the list of designated identifiers;
 in response to determining that the identifier is included in the list of designated identifiers, denying the request for the advertisement; and
 in response to determining that the identifier is not included in the list of designated identifiers,
  providing the advertisement in response to the request,
  extracting a set of features from the request and previous requests that originated from the source,
  based on the set of features, determining that:
   a botnet including a plurality of bots related to each other is associated with fraudulent activities, and the source is one of the plurality of bots in the botnet, and
  adding the identifier associated with the source to the list of designated identifiers.

2. The method of claim 1, further comprising:
 generating a boundary condition for each extracted feature of the set of features; and
 aggregating the generated boundary conditions to determine a set of rules, each rule corresponding to at least one extracted feature of the set of features.

3. The method of claim 2, further comprising:
 classifying the request based on the set of rules and one or more models;
 generating a label based on the classification of the request; and
 updating the one or more models with the generated label.

4. The method of claim 1, wherein the set of features include a type of device from which the request originates, a type of browser being executed on the device, a traffic parameter associated with the request, and a user behavior associated with the request.

5. The method of claim 4, wherein the user behavior associated with the request includes an average query length of the request and a click through rate of the request, and the traffic parameter associated with the request corresponds to a number of distinct queries associated with the source from the request originates.

6. The method of claim 1, wherein the extracted identifier corresponds to an IP address associated with the source, and the determining of whether the extracted identifier is included in the list of designated identifiers includes performing a real-time look-up of the extracted identifier in the list of designated identifiers, each identifier in the list being a classless inter-domain routing (CIDR) IP identifier, the list of CIDR IP identifiers being maintained in a radix tree format.

7. A system for providing protection against fraudulent advertisement requests, the system comprising:
 a list generator implemented by at least one processor, and configured to determine, via machine learning, a list of designated identifiers of fraudulent sources of requests for advertisements by:
  creating a multiple dimensional space including multiple regions that denote non-fraudulent activities, wherein multiple rules are determined based on multiple features of a user request, and wherein each of the multiple regions is created based on each of the rules including upper and lower limits of a value of a corresponding one of multiple features of a user request,
  extracting features from logged requests for advertisements from fraudulent sources and non-fraudulent sources, and
  if the extracted features lie outside the regions, including identifiers of the fraudulent sources into the list of designated identifiers of the fraudulent sources of requests for advertisements;
 a request handling unit implemented by at least one processor, and configured to receive a request for an advertisement;
 an extracting unit implemented by the at least one processor and configured to extract an identifier included in the request, the identifier being associated with a source from which the request originates; and
 an advertisement response unit implemented by the at least one processor and configured to
  determine whether the extracted identifier is included in the list of designated identifiers;
  in response to determining that the identifier is included in the list of designated identifiers, deny the request for the advertisement;

in response to determining that the identifier is not included in the list of designated identifiers,
provide the advertisement in response to the request,
extract a set of features from the request and previous requests that originated from the source,
based on the set of features, determine that:
a botnet including a plurality of bots related to each other is associated with fraudulent activities, and
the source is one of the plurality of bots in the botnet, and
add the identifier associated with the source to the list of designated identifiers.

8. The system of claim 7, wherein the advertisement response unit is further configured to:
generate a boundary condition for each extracted feature of the set of features; and
aggregate the generated boundary conditions to determine a set of rules, each rule corresponding to at least one extracted feature of the set of features.

9. The system of claim 8, wherein the advertisement response unit is further configured to:
classify the request based on the set of rules and one or more models;
generate a label based on the classification of the request; and
update the one or more models with the generated label.

10. The system of claim 7, wherein the set of features include a type of device from which the request originates, a type of browser being executed on the device, a traffic parameter associated with the request, and a user behavior associated with the request.

11. The system of claim 10, wherein the user behavior associated with the request includes an average query length of the request and a click through rate of the request, and the traffic parameter associated with the request corresponds to a number of distinct queries associated with the source from the request originates.

12. The system of claim 7, wherein the extracted identifier corresponds to an IP address associated with the source, and the determining of whether the extracted identifier is included in the list of designated identifiers includes performing a real-time look-up of the extracted identifier in the list of designated identifiers, each identifier in the list being a classless inter-domain routing (CIDR) IP identifier, the list of CIDR IP identifiers being maintained in a radix tree format.

13. A non-transitory computer readable medium including computer executable instructions, wherein the instructions, when executed by a computer, cause the computer to perform a method for providing protection against fraudulent advertisement requests, the method comprising:
determining, via machine learning, a list of designated identifiers of fraudulent sources of requests for advertisements by:
creating a multiple dimensional space including multiple regions that denote non-fraudulent activities, wherein multiple rules are determined based on multiple features of a user request, and wherein each of the multiple regions is created based on each of the rules including upper and lower limits of a value of a corresponding one of multiple features of a user request,
extracting features from logged requests for advertisements from fraudulent sources and non-fraudulent sources, and
if the extracted features lie outside the regions, including identifiers of the fraudulent sources into the list of designated identifiers of the fraudulent sources of requests for advertisements;
receiving a request for an advertisement;
extracting an identifier included in the request, the identifier being associated with a source from which the request originates;
determining whether the extracted identifier is included in the list of designated identifiers;
in response to determining that the identifier is included in the list of designated identifiers, denying the request for the advertisement; and
in response to determining that the identifier is not included in the list of designated identifiers,
providing the advertisement in response to the request,
extracting a set of features from the request and previous requests that originated from the source,
based on the set of features, determining that:
a botnet including a plurality of bots related to each other is associated with fraudulent activities, and
the source is one of the plurality of bots in the botnet, and
adding the identifier associated with the source to the list of designated identifiers.

14. The non-transitory computer readable medium of claim 13, the method further comprising:
generating a boundary condition for each extracted feature of the set of features; and
aggregating the generated boundary conditions to determine a set of rules, each rule corresponding to at least one extracted feature of the set of features.

15. The non-transitory computer readable medium of claim 14, the method further comprising:
classifying the request based on the set of rules and one or more models;
generating a label based on the classification of the request; and
updating the one or more models with the generated label.

16. The non-transitory computer readable medium of claim 13, wherein the set of features include a type of device from which the request originates, a type of browser being executed on the device, a traffic parameter associated with the request, and a user behavior associated with the request.

17. The non-transitory computer readable medium of claim 16, wherein the user behavior associated with the request includes an average query length of the request and a click through rate of the request, and the traffic parameter associated with the request corresponds to a number of distinct queries associated with the source from the request originates.

* * * * *